US009081861B2

(12) United States Patent
Lloyd et al.

(10) Patent No.: US 9,081,861 B2
(45) Date of Patent: Jul. 14, 2015

(54) UNIFORM RESOURCE LOCATOR CANONICALIZATION

(75) Inventors: Matthew Lloyd, Santa Monica, CA (US); Thomas Bergan, Los Angeles, CA (US)

(73) Assignee: Google Inc., Mountain View, CA (US)

(*) Notice: Subject to any disclaimer, the term of this patent is extended or adjusted under 35 U.S.C. 154(b) by 1627 days.

(21) Appl. No.: 12/177,111

(22) Filed: Jul. 21, 2008

(65) Prior Publication Data

US 2013/0144834 A1   Jun. 6, 2013

(51) Int. Cl.
G06F 7/00 (2006.01)
G06F 17/30 (2006.01)
G06F 17/00 (2006.01)

(52) U.S. Cl.
CPC .... G06F 17/30876 (2013.01); G06F 17/30864 (2013.01)

(58) Field of Classification Search
CPC ...................... G06F 17/30864; G06F 17/30887
USPC ............ 707/736, 999.001–999.005, 709, 741
See application file for complete search history.

(56) References Cited

U.S. PATENT DOCUMENTS

| 6,547,829 | B1* | 4/2003 | Meyerzon et al. ............. 715/234 |
| 6,910,077 | B2* | 6/2005 | Najork ................... 707/E17.108 |
| 2003/0131048 | A1* | 7/2003 | Najork ........................... 709/203 |
| 2006/0218143 | A1* | 9/2006 | Najork .............................. 707/6 |
| 2007/0208703 | A1* | 9/2007 | Shi et al. .......................... 707/3 |
| 2008/0091685 | A1* | 4/2008 | Garg et al. ...................... 707/10 |
| 2009/0164502 | A1* | 6/2009 | Dasgupta et al. ............. 707/102 |

* cited by examiner

Primary Examiner — Kannan Shanmugasundaram
(74) Attorney, Agent, or Firm — Brake Hughes Bellermann LLP

(57) ABSTRACT

A computer-implemented method includes receiving a plurality of uniform resource locators (URLs), where the URLs identify content files, and where the URLs include at least one parameter. Fingerprints of the content files are identified. A first entropy of values of the fingerprints conditional on values of a first parameter is determined, and a second entropy of values of the first parameter conditional on values of the fingerprints is determined. It is determined that the first parameter is irrelevant to the identification of a unique content file by the URLs based, at least in part, on the first and second entropy values.

24 Claims, 4 Drawing Sheets

UNIFORM RESOURCE LOCATOR CANONICALIZATION

TECHNICAL FIELD

This description relates to online crawling and search and, in particular, to uniform resource locator canonicalization.

BACKGROUND

Online resources or content items (e.g., web pages, video files, audio files, documents, etc.) available on the Internet can be associated with a document identifier, e.g., a Uniform Resource Locator (URL), that can be used to identify and locate a content item. Because the Internet is organic and heterogeneous, often many distinct URLs point to the same content item. Thus, even though the URLs themselves are different, the data fetched from the distinct URLs can be identical. Because of this, a web crawler that loads URLs from link tags on web pages that point to content (e.g., to index, store, and make the content accessible via a search query) may download the identical content that is specified by two different URLs. Yet some kinds of resources (e.g., video files) require significant network resources to download compared with other online content (e.g., text-based HTML web pages), because these resources are intrinsically high bandwidth content. Because bandwidth is an expensive and limited resource, it is desirable to avoid downloading the same content more than once.

Therefore, there is a need for a system that automatically identifies and manages document identifiers that reference the same content and thereby reduces the waste of resources both on the search engine side and the web server side.

SUMMARY

In a first general aspect, a computer-implemented method includes receiving a plurality of uniform resource locators (URLs), where the URLs identify content files, and where the URLs include at least one parameter. Fingerprints of the content files are identified. A first entropy of values of the fingerprints conditional on values of a first parameter is determined, and a second entropy of values of the first parameter conditional on values of the fingerprints is determined. It is determined that the first parameter is irrelevant to the identification of a unique content file by the URLs based, at least in part, on the first and second entropy values.

In another general aspect, a computer-implemented method includes receiving a plurality of uniform resource locators (URL), where the URLs identify a host and content files, and where the URLs include a plurality of parameters. An information content, relevant to the identification of a unique content file, of the parameters is determined, where the determination of the information content is based, at least in part, on an entropy of values of fingerprints of the content files conditional on values of the parameters and based, at least in part, on an entropy of values of the parameters conditional on values of the fingerprints. First parameters that are irrelevant to the identification of a unique content file on the host by the URLs are determined based, at least in part, on the information content of the first parameter, and second parameters that are relevant to the identification of a unique content file on the host by the URLs are determined based, at least in part, on the information content of the second parameters.

In another general aspect, a computer program product tangibly embodied on a computer-readable medium includes executable instructions. When the instructions are executed they cause a data processing apparatus to receive a plurality of uniform resource locators (URL), where the URLs identify a host and content files stored on the host, and where the URLs include a plurality of parameters. The executed instructions also cause the data processing apparatus to determine an information content, relevant to the identification of a unique content file stored on the host, of the parameters, where the determination of the information content is based, at least in part, on an entropy of values of fingerprints of the content files conditional on values of the parameters and is based, at least in part, on an entropy of values of the parameters conditional on values of the fingerprints. The executed instructions also cause the data processing apparatus to determine first parameters that are irrelevant to the identification of a unique content file on the host by the URLs based, at least in part, on the information content of the first parameters and to determine second parameters that are relevant to the identification of a unique content file on the host by the URLs based, at least in part, on the information content of the second parameters.

In another general aspect, a system for crawling and indexing online content includes a parser configured to parse a plurality of URLs to identify parameters in the URLs, where the URLs identify a host and content files. The system further includes an information content calculation module configured to determine an information content, relevant to the identification of a unique content file, of the parameters, where the determination of the information content is based, at least in part, on an entropy of values of fingerprints of the content files conditional on values of the parameters and based, at least in part, on an entropy of values of the parameters conditional on values of the fingerprints. The system also includes a relevancy calculation module configured to determine first parameters that are irrelevant to the identification of a unique content file on the host by the URLs based, at least in part, on the information content of the first parameters and configured to determine second parameters that are relevant to the identification of a unique content file on the host by the URLs based, at least in part, on the information content of the second parameters.

DETAILED DESCRIPTION

Figure 1:
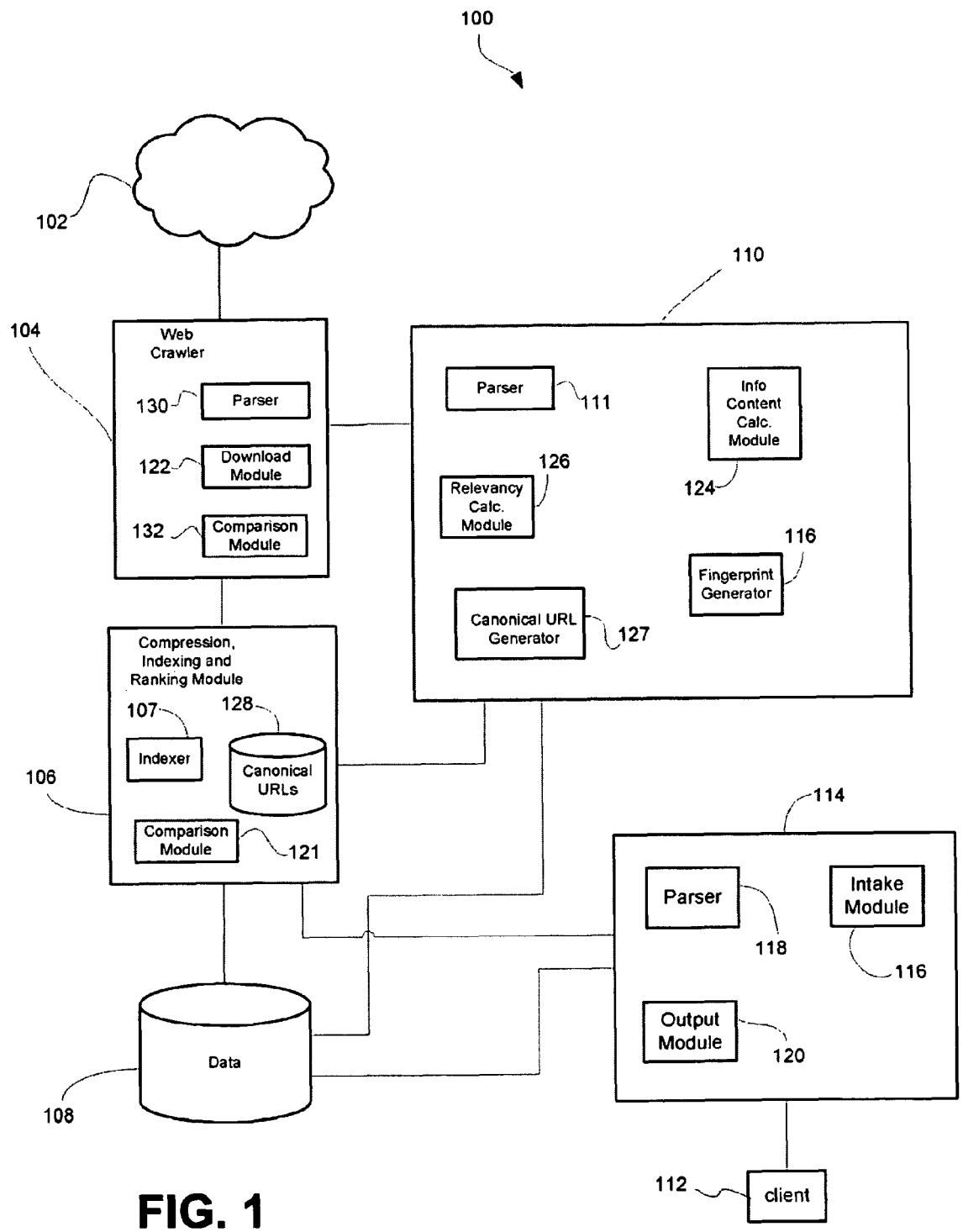
FIG. 1 is a schematic block diagram of a system for determining the relevance of a URL parameter for identifying a content item referenced by the URL.

FIG. 1 is a schematic block diagram of a system 100 for identifying different URLs that reference the same content and for generating canonical URLs that are equivalent, for purposes of identifying the content, to the different URLs that reference the same content. The system 100 can receive, as input, a number of different URLs, some of which reference the same content and some of which reference different content. Based on this input the system can determine which portions of the URLs are relevant, and which portions are irrelevant, to the identification of the content. From this information the system 100 may determine canonical URLs that provide a simple template of the basic relevant parameters that are required to identify content. Then, when a new URL is received, a canonicalized version of the new URL can be compared to the canonical URLs, and if the canonicalized version of the new URL matches a canonical URL that references already-downloaded content, the new URL can be equated with the canonical URL, such that the content referenced by the new URL need not be downloaded. If a match is not found then the content referenced by the new URL can be downloaded for further analysis and use.

In one implementation, a web crawler 104 can crawl or otherwise search through a corpus of content files 102 (e.g., websites available on the world-wide web (WWW)) to select material (e.g., web pages, documents, audio files, and video files) for storage in an indexed form in a data center 108. A module 106 that includes an indexer 107 can compress, index, and rank the selected material before the material is stored in the data center 108. As discussed in more detail below, an analysis module 110 can identify different URLs that reference the same content and can determine a canonical URL equivalent to the different URLs that reference the identical content.

During a search process, a client 112 may submit a search query to a search engine server 114 to request material relevant to the query. For example, a user of the client 112 can enter the query through a web browser running on the client 112. The query can be expressed in the form of an unstructured text string entered in a single entry field of the browser, and the query can include a number of phrases, where a phrase can be a single word, a group of words, or a character string. In some implementations, the query may include a text string that is generated from an audio file, e.g., when the user submits a query in the form of a spoken message that is converted to the text string through a voice recognition processor. An intake module 116 of the server 114 can receive the query from the client 112, and a parser 118 can parse the query into subcomponents. In response to query, a search engine running on the server 114 can use phrases specified in the query, as well as synonyms and stems for the phases, to identify highly-ranked material that satisfy the query. The server 114 can return responses to the query via an output module 120 to the web browser of the client 112, where the responses contain information (e.g., webpages, documents, video files, audio files) satisfying the query along with ranking information and references to the identified documents.

In another implementation, the query can include a URL that references content desired by a user. The URL of the desired content, and/or parsed components of the URL can be passed to the compression, indexing, and ranking module 106, where a comparison module 121 can compare it to a list of canonical URLs stored in database 128. If a match between a canonical URL and a canonicalized version of the URL of the desired content exists, the desired content can be served from the data store 108, and if a match does not exist, the desired content can be sourced from another location.

To identify content for storage in the data store 108, a download module 122 (e.g., included in the web crawler 104) can be used to download content files identified by URLs. For example, the web crawler 104 can include a program or an automated script that browses the WWW in a methodical, automated manner to identify content for analysis, storage, and serving to client users. Once the content has been identified by the web crawler it can be downloaded by the download module 122. In one implementation, the web crawler can identify the content referenced by all URLs on a web page for download. Then, any URLs in the downloaded content can be followed to identify additional content for downloading. This process of following the links in the URLs of downloaded content to identify additional content for downloading can be repeated to identify and download a large corpus of content. Other implementations of the web crawler can use different methods to crawl, identify, and download online content.

Once a number of URLs and the content that they reference have been downloaded, the analysis module 110 can analyze the URLs and the content to determine parameters of the URLs that are relevant or irrelevant to the identification of unique content files. For example, hypertext transfer protocol (HTTP) URLs typically include a host, a path, and a query. Thus, in the example URL, http://host/path?query, "host" specifies the name of the host, "path" specifies a path on the host, and "query" specifies a query. The prefix "http" specifies that the HTTP protocol is used to access the content. Details of the structure and format of URLs can be found in the Internet request for comments (RFC) 2396 about uniform resource identifiers, available at http://www.faqs.org/rfcs/rfc2396.html, in Internet RFC 3986 about uniform resource identifier general syntax, available at http://www.ietf.org/rfc/rfc3986.txt, and in Internet RFC2616 about the HTTP protocol, available at http://www.faqs.org/rfcs/rfc2616.html, each of which is incorporated herein by reference for all purposes. The analysis module 110 can include a parser 111 configured to parse URLs to determine different parts of the URL (e.g., the host, path, and different parameters).

In general, two URLs that reference the same content file (e.g., a video file) might differ in any of the host, the path, or the query parts of the URL. For example, the following four URLs might reference the same video content file:

$$\text{http://xyz.com/content/video?file=news20080115\&player=small} \tag{1}$$

$$\text{http://xyz.com/content/video?player=small\&file=news20080115} \tag{2}$$

$$\text{http://xyz.com/content/video?player=small\&file=news20080115 \&irrelevantparam=1} \tag{3}$$

In each case of the example URLs (1), (2), and (3), the host part ("xyz.com") and the path part ("content") of the URLs are identical, and the three URLs differ only in their query parts. Because this is true for a large proportion of URLs that point to the same video, we treat this example situation first, where only the query part of the URLs vary, while the host and the path are identical for all the URLs under consideration. As shown in the URLs above, the query portion of the URLs can include a sequence of parameter-value pairs separated by ampersands. In general, the exact order of the parameters within the URL does not play a role in identifying particular content.

In general, to determine whether two URLs (URL1 and URL2) reference, or point to, the same content without retrieving the content itself, a canonicalization function, C(URL), that transforms the input URL into its equivalence class can be applied to the URLs and the results of the function can then be compared. A perfect canonicalization function would have the property that C(URL1)=C(URL2) if and only if URL1 and URL2 point to the same content.

An example canonicalization function is a function that rearranges the parameter-value pairs of URLs, so that the parameter names are in alphabetical order. For example, such a function, when applied to the URLs, http://xyz.com/video?z=1 &m=2&a=3, http://xyz.com/video?m=2&z=3&z=1, and http://xyz.com/video?z=1&q=4&a=3 yields:

$$C(\text{http://xyz.com/video?z=1\&m=2\&a=3})=\text{http://xyz.com/video?a=3\&m=2\&z=1} \tag{4}$$

$$C(\text{http://xyz.com/video?m=2\&z=3\&z=1}) = \text{http://xyz} \\ \text{.com/video?a=3\&m=2\&z=1} \quad (5)$$

$$C(\text{http://xyz.com/video?z=1\&q=4\&a=3}) = \text{http://xyz} \\ \text{.com/video?a=3\&q=4\&z=1} \quad (6)$$

The URLs shown in equations (4) and (5) point to the same content, and their canonicalized URLs are also equal, as they should be. The URL shown in equation (6) points to different content and has a different canonical URL than that of the URLs shown in equations (4) and (5). Such a canonicalization function is universal across HTTP URLs and can be applied to any URL.

There are other canonicalization functions that may be applicable to URLs that identify content on some hosts but may not be applicable to URLs that identify content on other hosts. For example, on some hosts, a particular query parameter might be unnecessary and can be dropped entirely without affecting the content the URL references. Thus, for example, the following two URLs might point to the same content, if the parameter "junk" in the URL is irrelevant to the identification of a content item:

$$\text{http://xyz.com/video?junk=123\&file=news.mpeg}, \quad (7)$$

$$\text{http://xyz.com/video?file=news.mpeg}. \quad (8)$$

However, on a different host the parameter "junk" may provide useful information for the identification of unique content files an should not be discarded in a canonicalization process Thus, for some URL parameters, the question of whether the parameter can be safely removed from the URL according to a canonicalization function depends on how the parameter is used in URLs that are specific to a particular host. Other parameters that are common to many hosts may be classified as either universally relevant or universally irrelevant to the identification of a content item. Parameters that generally are relevant across all hosts are parameters whose values capture the most information about which content item is being requested, e.g. a filename, a folder, or a content ID. Thus, a good canonicalization function maintains such parameters as relevant, while discarding parameters that are identified as irrelevant to the identification of specific content items.

For example, relevant parameters can include parameters that uniquely identify a content file, e.g., a content identification parameter or a path that includes a filename. Relevant parameters also include parameters that assist in uniquely identifying a content file, even though the parameters themselves do not uniquely identify the content, e.g., parameters that identify a path, a content category, and certain parameters that identify some general file names of file types (e.g., file extensions that are generally known to refer to different content, such as "mpg," "mov," and "wmv."). Irrelevant parameters can include parameters that refer to state information, session parameters that are not essential for retrieval (e.g., tracking IDs), session parameters essential for retrieval but that do not identify or assist in identifying content (e.g., login information or session IDs), and parameters that are obsolete.

Note that a distinction can be drawn between two partially related dichotomies: irrelevant vs. relevant parameters, and unnecessary vs. necessary parameters. Some parameters that are irrelevant to the identification of a content item may be necessary to the retrieval of the content, even though their value does not give information about which content item is referenced by the URL. For example, a host specified by the URL may require such a parameter to validate a user's login credentials. Because a canonicalization function is used only to determine which equivalence class a URL falls into for purposes of identifying a content item, and is not used to generate a valid URL that could be used to retrieve the content item, necessary, irrelevant parameters can be discarded by a canonicalization function even if they are necessary for the retrieval of the content. Thus, although canonical URLs are useful for relating different URLs that reference the same content, canonical URLs cannot necessarily be used to retrieve the content.

To determine automatically and empirically whether parameters used in a URL are relevant or irrelevant for purposes of identifying a content item, an information content calculation module (ICCM) 124 within the analysis module 110 can analyze the relationships between a number of different URLs and a number of different content files referenced by the URLs to determine the information content of each parameter. As explained in more detail below, the ICCM 124 can use a generalized algorithm based on information theory to classify each parameter as relevant or irrelevant given a corpus of URLs and the content referenced by the URLs. This corpus can be compiled from URLs that have been crawled by the web crawler 104 and the content that has been downloaded by the download module 122.

In general, the ICCM 124 receives as input a number of URLs that differ in at least some of their query parameters and also receives as input fingerprints of the content referenced by the URLs. A fingerprint of a content file can be a hash of the content file (e.g., an MD5 hash), which provides a small-size hexadecimal string that represents the content file. The fingerprints of the content files can be downloaded by the download module 112, or can be generated within the system 100 by a fingerprint generator 116. For example, the fingerprint generator 116 can be part of the analysis module 110. In another implementation, the fingerprint of a content item can be the entire content item itself. By examining each parameter of the URLs individually and how they relate to the fingerprints, the ICCM 124 can determine an information content, relevant to the identification of a unique content item, possessed by each parameter.

The information content of a parameter can be illustrated with the examples shown in the following four tables, each of which considers a case showing four relationships between the value of the URL parameter and a fingerprint of a content file referenced by the URL. In each case, the value of a parameter, V, is shown in a column on the left, and a fingerprint (FP) is shown in a column on the right.

TABLE 1

Case 1

| V | FP |
|---|----|
| A | 1  |
| B | 1  |
| C | 1  |
| D | 1  |

TABLE 2

Case 2

| V | FP |
|---|----|
| A | 1  |
| A | 3  |
| A | 2  |
| A | 4  |

TABLE 3

Case 3

| V | FP |
|---|---|
| A | 1 |
| B | 1 |
| A | 2 |
| B | 2 |

TABLE 4

Case 4

| V | FP |
|---|---|
| A | 1 |
| C | 3 |
| B | 2 |
| D | 4 |

In case 1, four different values of the parameter (A, B, C, D) map to a single fingerprint (1). Thus, unique values of the parameter do not correlate with unique fingerprints, and therefore the parameter value does not contribute any information for identifying the content file. In case 2, one value of the parameter (A) maps to four different fingerprints (1, 3, 2, 4). In this case, a singe parameter value correlates with multiple unique parameter values, and therefore the parameter value does not contribute any information for identifying the content file. In case 3, there are two values of the parameter (A, B) and there are two values of the fingerprint (1, 2). However, there is not a one-to-one correlation between the parameter values and the fingerprints, so the unique parameter values do not identify unique content files in this case. In case 4, four unique parameter values map to four different fingerprints, and therefore, in this case, the value of the parameter provides relevant information for the identification of a unique content file.

To perform an analysis of the information content of a URL parameter quantitatively, the ICCM 124 can compute an entropy of the fingerprint values conditional on the values of the parameters of the URLs and an entropy of the parameter values conditional on the fingerprint values. These entropies can also be known as the conditional entropies, H(fingerprints|values) (or H(F|V)) and H(values|fingerprints) (or H(V|F)), respectively. The first entropy, H(F|V), also can be known as the entropy of fingerprint values conditional on the parameter values, and the second entropy, H(V|F), can be known as the entropy of the parameter values conditional on the fingerprint values. Both entropies can be measured in units of bits.

The formula used to compute the conditional entropy is $$H(Y \mid X) = -\sum_{x,y} (P(x, y) \cdot \log_2 P(x, y)) + \sum_{x} (P(x) \cdot \log_2 P(x)), \quad (9)$$

where P(x) is the probably of an event, x, and P(x, y) is the joint probability of events x and y. These probabilities are computed by dividing a count of the parameter values or fingerprints in the list of URLs by the total number of URLs. For the purpose of this calculation, if the parameter is not present in a specific URL, a special "unused" value marker can be substituted.

When equation (9) is applied to the combinations of parameter values and fingerprints in Table 1 above, the entropy H(V|F) is $$H(V|F) = -4 \cdot (0.25) \cdot \log_2(0.25) + P(1) \cdot \log_2 P(1) = 2 \text{ bits}, \quad (10)$$

and the entropy H(F|V) is $$H(F|V) = -4 \cdot (0.25) \cdot \log_2(0.25) + 4 \cdot (0.25) \cdot \log_2(0.25) = 0 \text{ bits}. \quad (11)$$

Similarly, for Case 2, H(V|F)=2 bits and H(F|V)=0 bits. For Case 3, H(V|F)=1 bits and H(F|V)=1 bit. For Case 4, H(V|F)=0 bits and H(F|V)=0 bits.

The value of H(F|V) represents the uncertainty that remains about which fingerprint is pointed to by a URL having a particular parameter, given that the value of the parameter is known. If H(F|V) is relatively high, the parameter does not provide much information about the fingerprint, and it is likely to be an irrelevant parameter. The value of H(V|F) represents the uncertainty that remains about the value of the parameter, given that the fingerprint is known. If the parameter value is essentially random and not related to the fingerprint, H(V|F) will be relatively high.

After the ICCM 124 has calculated H(F|V) and H(V|F), these entropy values can be passed to a relevancy calculation module (RCM) 126, which can determine whether a parameter is relevant or not, based, at least in part, on the values of H(F|V) and H(V|F). For example, the RCM 126 may deem a parameter relevant if and only if the values of both H(F|V) and H(V|F) are below respective thresholds chosen to produce an efficient tradeoff between ignoring a parameter that is actually relevant, which leads to content items that are not downloaded even though they should be, and keeping a parameter that is not relevant, which leads to retrieving the same content item more than once. Thus for example, if the thresholds for both H(V|F) and H(F|V) are each 0.5 bits, then based on the above entropy calculations for the Cases 1-4, the parameter, V, in Cases 1, 2, and 3 would be deemed irrelevant, while the parameter would be deemed relevant in Case 4.

The above calculations can be applied to a group of URLs that all refer to the same host and path, or to a group of URLs that all refer to the same host but to different paths, or to URLs that can refer to any host/path combination. In one implementation, when entropies are calculated for a cluster of URLs that refer to a particular host or host/path combination, if the host or host/path cluster contains fewer than a fixed number of URLs, no rules are generated for the cluster. Otherwise, for each query parameter in the URLs, the ICCM 124 and the RCM 126 can determine whether the parameter is relevant or not, using the entropy quantities described above. Then, a canonical URL generator (CUG) 127 can generate canonical URLs by applying rules to parameters of a URL based on whether the parameters in the URLs are relevant or not. For irrelevant parameters, the rule can be <ParameterName: IGNORE>. For relevant parameters, the rule can be <ParameterName: ACCEPT>.

When the ICCM 124 and the RCM 126 automatically determine rules by considering clusters of URLs for different hosts or host/path combinations, then the automatically generated rules for each host or host/path can be merged together and applied by the CUG 127 to all URLs that reference the particular host. The automatically generated rules can also be combined with a list of manually generated heuristic rules to generate the final list of rules for each host. Such manually generated rules may include a rule that orders individual URL parameters alphabetically, a case-sensitivity rule that converts all upper case letters to lower case letters, a rule that deems any parameter having a name equal to "vid," "file," or "path" to be relevant, and a rule that deems any parameter having a name equal to "sessionid" to be irrelevant. A database of such rules can be maintained in the system 100, e.g., in the RCM 126. When the entropy calculation is performed for parameters using all URLs for a given host, rather than for individual host/path clusters on a host, no host/path rule merging is required. In this implementation, the automatically generated rules can also be combined with the list of manually generated heuristic rules.

It is possible that rules for a parameter generated from clusters of URLs from some host/path combinations may conflict with rules for the parameter generated from other clusters of URLs from other host/path combinations. In such a situation, in one implementation, the RCM 126 may determine that the rule for the parameter can be host/path specific, such that it is different for different host/path combinations. In another implementation, the RCM 126 may determine the final rule for the parameter, which can apply for all host/path combinations, by calculating a ratio between the number of host/paths for which the parameter is relevant to the number of host/paths for which the parameter is irrelevant. If the ratio is above a threshold value, the RCM 126 may determine that the parameter is a relevant final rule, and if the ratio is below or equal to the threshold value then the RCM 126 may deep the parameter to be irrelevant. In another implementation, the RCM 126 may determine that a parameter is relevant for all paths on a host if the parameter is determined to be relevant on any of the paths for the host.

It is further possible that an automatically generated rule for a URL parameter may conflict with a manually generated heuristic rule for a particular host. In such a case, in one implementation, the manually generated heuristic rule may trump the automatically generated rule for that URL parameter on that host.

The final rules as determined by the ICCM 124 and the RCM 126 can be used by the CUG 127 in a canonicalization function to transform a URL into its equivalence class, for example, by accepting or rejecting certain parameters as relevant for purposes of identifying a unique content file. Canonical URLs can be stored in a data store 128, which, in one implementation, can be part of the compression, indexing, and ranking module 106. A canonicalization function can be applied to compare URLs that reference the same host and path, or URLs that reference only the same host, or URLs that reference any host and any path. If no automatically generated rules are generated for a corpus of URLs (e.g., URLs that reference a specific host) the canonicalization function may not drop any query parameters, but it may alter the URL according to the one or more heuristic rules. For example, as described above, URL parameters can be ordered alphabetically or made case-insensitive. In addition, URLs can be unescaped, to convert them to their unescaped equivalents. Thus, special URL encoded characters (e.g., "%20," which represents a space between characters in an HTTP URL) can be converted into normal characters. According to another exemplary heuristic rule, query parameters can be deemed relevant or irrelevant based on a fixed list of relevant or irrelevant parameters.

Once rules based on the information content of URL parameters have been defined for use with a canonicalization function and canonical URLs have been determined, the web crawler 104 can use the canonical URLs as follows. As the web crawler 104 crawls through and extracts URLs from web pages, an extracted URL can be parsed, e.g., by a parser 130, to determine the components of the URL and then the URL is canonicalized according to a canonicalization function to produce a canonical URL. A comparison module 132 of the web crawler 104 can query the database 128 to determine whether a matching canonical URL exists in the database 128, and if a content item corresponding to the matching URL has been retrieved before. If the content item has been retrieved before, the download module 122 of the crawler need not download the content again, and the web crawler 104 can discard the URL from further consideration.

If a matching canonical URL is not found in the database 128, then the download module 122 downloads the content referenced by the original extracted URL (not the canonicalized URL) and stores the content in the data store 108. The ICCM 124, the RCM 126, and the CUG 127 can generate a canonical URL from the original extracted URL, and this canonical URL is stored in the database 128 and serves to index the downloaded content. An indexer 107 can index the content, such that the content can be easily retrieved based on the index information, such as, for example, the canonical URL, keywords, and other metadata. In addition, the fingerprint generator 116 can compute a fingerprint of the downloaded content to provide training data for the above-described information theoretical techniques used to generate canonical URLs.

To account for the dynamic nature of the web, in some implementations, the download module 122 can periodically download a small, random sample content items that are referenced by discarded URLs. These discarded URLs and the content they point to can provide further evidence to support or refute existing rules, or can provide training data for new rules.

In some cases, a query parameter of a URL can itself be a URL. The presence of certain, specific character sequences (e.g. "http" and "://" in the value of a query parameter can indicate that the query parameter is in fact itself a URL. For example, the URL, http://xyz.com/video?irrelevant=1&url="http://abc.com/video?irrelevant2=2" includes a host name ("xyz.com"), a path name ("video") and two parameters ("irrelevant" and "url"). The parameter named "url" has the value http://abc.com/video?irrelevant2=2. When canonicalizing a URL that includes as one of its parameters another URL, the value of this other URL also can be canonicalized. For example, the following URLs:

$$\text{http://xyz.com/video?irrelevant=1\&url="http://abc.com/video?irrelevant2=2"} \quad (12)$$

$$\text{http://xyz.com/video?irrelevant=2\&url="http://abc.com/video?irrelevant2=3"} \quad (13)$$

each might be transformed via a canonicalization function, C(URL) to the canonical URL $$\text{http://xyz.com/video?url="http://abc.com/video"} \quad (14)$$

where the parameters "irrelevant" and "irrelevant2" are determined to be irrelevant. Thus, when certain character sequences (e.g., "http" or "://") are detected in the value of a URL parameter (e.g., by the parser 130 in the web crawler or the parser in the analysis module 110), a rule can be triggered to canonicalize the value of the URL parameter itself.

In another implementation, the relevance of a group of two or more parameters, considered together, can be determined by the ICCM 124 and the RCM 126. This is done because the group of parameters might be considered relevant by the RCM 126 even if the parameters would be deemed irrelevant when considered individually. For example, when analyzing the four following URLs that each reference a content item having a different fingerprint, e.g., fingerprints equal to "15", "16", "17", and "18", respectively, $$\text{http://xyz.com/video?path=cats/kittens\&file=a.mpg,} \quad (15)$$

$$\text{http://xyz.com/video?path=cats/kittens\&file=b.mpg,} \quad (16)$$

$$\text{http://xyz.com/video?path=cats/tigers\&file=a.mpg,} \quad (17)$$

$$\text{http://xyz.com/video?path=cats/tigers\&file=b.mpg,} \quad (18)$$

the ICCM 124 may consider the path and file parameters to be irrelevant, because H(V|F)=1 for both the path and file parameters, and this entropy value may be above some predetermined threshold. However, both the path and file parameters are required to uniquely determine which content item is referenced by the URL, and therefore the combination of the path and file parameters is relevant.

This relevancy information can be determined automatically as follows. After an initial analysis, as described above, of whether or not parameters on a host are individually relevant, the ICCM 124 and the RCM 126 can analyze tuples (e.g., pairs, triples etc.) of query parameters, where at least one of the parameters in the tuple has been marked as individually irrelevant. Then, the ICCM 1224 can determine H(V'|F) and H(F|V') as described above, where V' indicates a parameter tuple, and the RCM can use the results of the entropy calculations to determine if the tuple is a relevant parameter. If it is, all the individual parameters in the tuple are deemed relevant by the RCM 126, so that they will all be considered in a canonicalized version of a URL.

For example, when considering the relevance of the path/file tuple for the URLs (15), (16), (17), and (18), the ICCM 124 would determine that H(V'|F)=0 and H(F|V')=0. The RCM 126 therefore would determine that the tuple is relevant, and both the path and file parameters would be deemed relevant for purposes of identifying a content file. A canonicalization function would retain both parameters as relevant.

Whether a URL parameter is case-sensitive, for purposes of identifying a content file, can be analyzed by the system 100. In a first example, if two different URLs using the parameter v=video.mpg and using the parameter v=VIDEO.mpg, respectively, each reference a content file having the same fingerprint, then the parameter likely is not case-sensitive. However, in a second example, if four URLs using the parameters, v=video.mpg, v=VIDEO.mpg, v=video2.mpg, and v=VIDEO2.mpg, reference content files having fingerprints, fp=1, fp=2, fp=3, and fp=4, respectively, then the parameter likely is case-sensitive. After determining the case-sensitivity of a parameter, a canonicalization function applied by the CUG 127 can discard case information for case-insensitive query parameters, but retain case information for case-sensitive parameters. The analysis module 110 can determine automatically whether or not a parameter is case-sensitive as follows.

The ICCM 124 can create a set of test URLs in which the case information of a parameter is removed by converting each value of the parameter into lower case for all the URLs in the set. The set of URLs with a value having its case information removed can be denoted as lower(V). Then, the ICCM 124 can determine the quantity, H(F|lower(V))−H(F|V), which measures the reduction in uncertainty (e.g., entropy) about the fingerprints of content files given the addition of case information to the values. If this quantity is greater than some predetermined threshold, the parameter can be deemed case-sensitive by the RCM 126, and case should be preserved during canonicalization. If the quantity is lower than the threshold, then the parameter is case insensitive and every value for the parameter should be converted to lower case according to a canonicalization function. By way of example, for the first set of URLs above, this quantity is 0 bits, because case information provides no information about the content file referenced by the parameter, v, since URLs having the parameters v=video.mpg and v=VIDEO.mpg both reference the same content file. For the second set of URLs, the value of this quantity is 1 bit, which, if the value of the threshold is less than 1, would indicate that the parameter is case-sensitive and that the case of the parameter values should be preserved according to a canonicalization function.

In another implementation, the ICCM 124 can determine the information content of a path for purposes of identifying a content file. For example, path components of a set of URLs can be considered as URL parameters, and the entropy values, H(V|F) and H(F|V), can be calculated to determine the information content of path components of the URLs. In general, this analysis is performed on a per-host basis, such that the information content of paths on a particular host are considered. The generated canonicalization rules then would specify on a per-host basis whether the path itself or any of its components should be stripped during canonicalization. For example, if the URLs http://site.com/path1?video=a.mpeg and http://site.com/path2?video=a.mpeg each reference the content file, then the path parameter may be irrelevant to the identification of the content file and can be stripped from the URL during canonicalization of the URL. Often, a path would be deemed to be irrelevant if considered individually, but a tuple of the path and one or more query parameters may be deemed to be relevant, so path parameters generally should be analyzed together with the regular query parameters as tuples, as described above.

Calculating a conditional entropy of a host portion of a set of URLs to determine whether the host is relevant to the identification of unique content files may not yield significant information. However, certain parts of a host name can be analyzed individually to determine whether they are relevant to the identification of a unique content file. For example, a portion of the host name that appears before the domain name can be analyzed (e.g., in the host name, video.google.com, the domain is "google.com" and the prefix is "video."). Thus, for a cluster of URLs having the same domain name, the non-domain prefix part of the host can be treated as a separate query parameter to be processed by the ICCM 124 to determine its information content. Thus, for the URLs and corresponding fingerprints, http://www1.site.com/watch?video=1; fp=1 and http://www2.site.com/watch?video=1; fp=1, the prefix (www1 or www2) of the host name is not relevant to the identification of the content file.

In some implementations, after the ICCM 124 performs an initial analysis of the information content of a URL parameter and the RCM 126 makes an initial determination that a parameter is irrelevant to the identification of a content file, the accuracy of this initial determination can be tested or refined automatically by the system 100. In one implementation, the analysis module 110 can pass a known URL that references a known content item having a known fingerprint to the web crawler 104. The analysis module 110 can instruct the web crawler 104 to modify or remove a value of the URL parameter that is initially determined to be irrelevant and then to download the content item referenced by the modified URL. The comparison module 132 can compare the downloaded content item to the known content item (or can compare their fingerprints). An indication from the comparison module 132 that the two content items are identical then would confirm a hypothesis that the URL parameter is indeed irrelevant and would refute a hypothesis that the parameter is relevant. Conversely, if the comparison module 132 indicates that the two content items are not identical, then this would confirm a hypothesis that the URL parameter actually is relevant.

In some implementations, to further reduce the amount of duplicative content that is downloaded by the web crawler 104, instead of downloading an entire content file from which a fingerprint can be generated for use in entropy calculations performed by the ICCM 124, a smaller size fingerprint of the content file can be downloaded by the download module 122. For example, if two HTTP content files are identical, it is likely that value of the "Content-Length" header field of the two files also is identical. Thus, the download module 122 may issue an HTTP HEAD request to download some or all header information of content files referenced by URLs rather than issuing an HTTP GET request to download the entire content, and the information downloaded in response to the HEAD request can be used as a fingerprint of the content files in the entropy calculations performed by the ICCM 124.

The ultimate determination of whether or not a URL parameter is relevant to the identification of content files can be based on multiple sources of information, including the conditional entropy calculations, H(V|F) and H(F|V), performed by the ICCM 124, manual heuristic rules, and the appearance of the parameter name on a predetermined list of relevant or irrelevant parameters. These multiple sources of information can be combined using Bayes's theorem to determine an ultimate probability that a parameter is relevant or irrelevant. For example, the RCM 126 may determine that a relevance determination based on the conditional entropy calculations is accurate 90% of the time, that a relevance determination based on manual heuristic rules is accurate 95% of the time, and that a relevance determination based on a fixed list of relevant and irrelevant parameters is accurate 80% of the time. Then, the RCM 126 may compute a probability that a parameter is relevant based on the combination of the information derived from these different analyses.

Therefore, to reduce the overall bandwidth cost of testing a hypothesis that a URL parameter is irrelevant by retrieving the content item referenced by a modified URL or a fingerprint of the content item, an initial determination of the probability that the parameter is relevant can be determined by the RCM 126. Then, only parameters whose probabilities lie within some predetermined range of uncertainty (e.g. 10%<p<90%) would be tested by the HTTP HEAD or HTTP GET request for content referenced by a modified URL.

Figure 2:
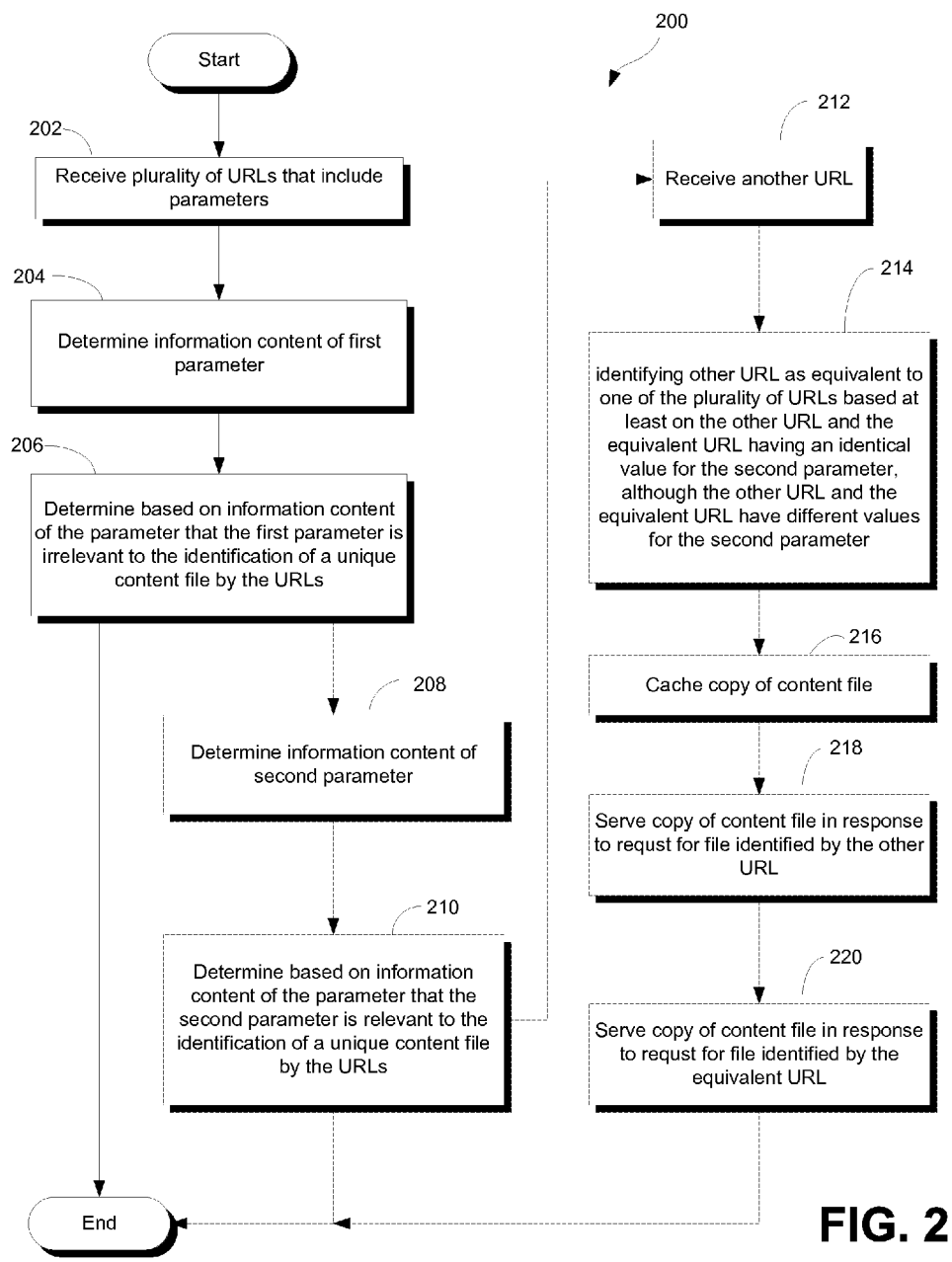
FIG. 2 is a flowchart illustrating example operations of the system of FIG. 1.

FIG. 2 is a flowchart 200 illustrating example operations of the system of FIG. 1. As shown in FIG. 2, after a start operation, a plurality of uniform resource locators (URLs) are received (202). For example, the URLs can be received as a result of a web crawling process performed by the web crawler 104. In another implementation the URLs can be received from a database that stores a group of URLs. The URLs identify content files, and include at least one parameter.

An information content of a first parameter of the URLs is determined, where the information content provides a measure of the relevance of the parameter to the identification of a unique content file (204). Then, it is determined, based, at least in part, on the information content of the parameter, that the first parameter is irrelevant to the identification of a unique content file by the URLs (206). For example, in one implementation, the information content of the first parameter can be determined by an ICCM 124 that calculates an entropy of values of the fingerprints conditional on values of the first parameter for the URLs and that calculates an entropy of values of the first parameter conditional on values of the fingerprints.

In another implementation, an information content of a second parameter of the URLs can be determined (208). Then, it can be determined, based, at least in part, on the information content of the second parameter, that the second parameter is relevant to the identification of a unique content file by the URLs (210). For example, the information content of the second parameter also can be determined by the ICCM 124, which can calculate an entropy of values of the fingerprints conditional on values of the second parameter and which can calculate an entropy of values of the first parameter conditional on values of the fingerprints.

Another URL can be received in addition to the plurality of URLs (212), and the other URL can be identified as equivalent to one of the plurality of URLs for purposes of identifying a particular content file (214), based at least on the other URL and the equivalent URL having an identical value for the second parameter, even though the other URL and the equivalent URL have different values for the first parameter. For example, after a number of canonical URLs have been generated and stored in the database 128, the web crawler 104 may locate a URL as a result of a crawling process, which may be canonicalized and compared to the canonical URLs in the database 128. If the other URL and one of the canonical URLs have identical values for relevant parameters in the URLs they may be identified as equivalent for purposes of identifying a content file, even though the other URL and the equivalent URL have different values for the first parameter.

In another example, if a user requests a content file referenced by the other URL from a server, the server can compare the other URL to canonical URLs stored in a database. Then, if the other URL and one of the canonical URLs have identical values for relevant parameters in the URLs they may be identified as equivalent for purposes of identifying a content file, even though the other URL and the equivalent URL have different values for the first parameter. If such a match is found between the canonicalized form of the other URL and one of the canonical URLs, then the server may serve the requested content from cached content that is identified by the canonical URL. Thus, a copy of a particular content file can be cached (216), and a copy of the cached particular content file can be served (218) in response to a request for a content file identified by the other URL, and a copy of the cached particular content file also can be served in response to a request for a content file identified by the equivalent URL (220).

Figure 3:
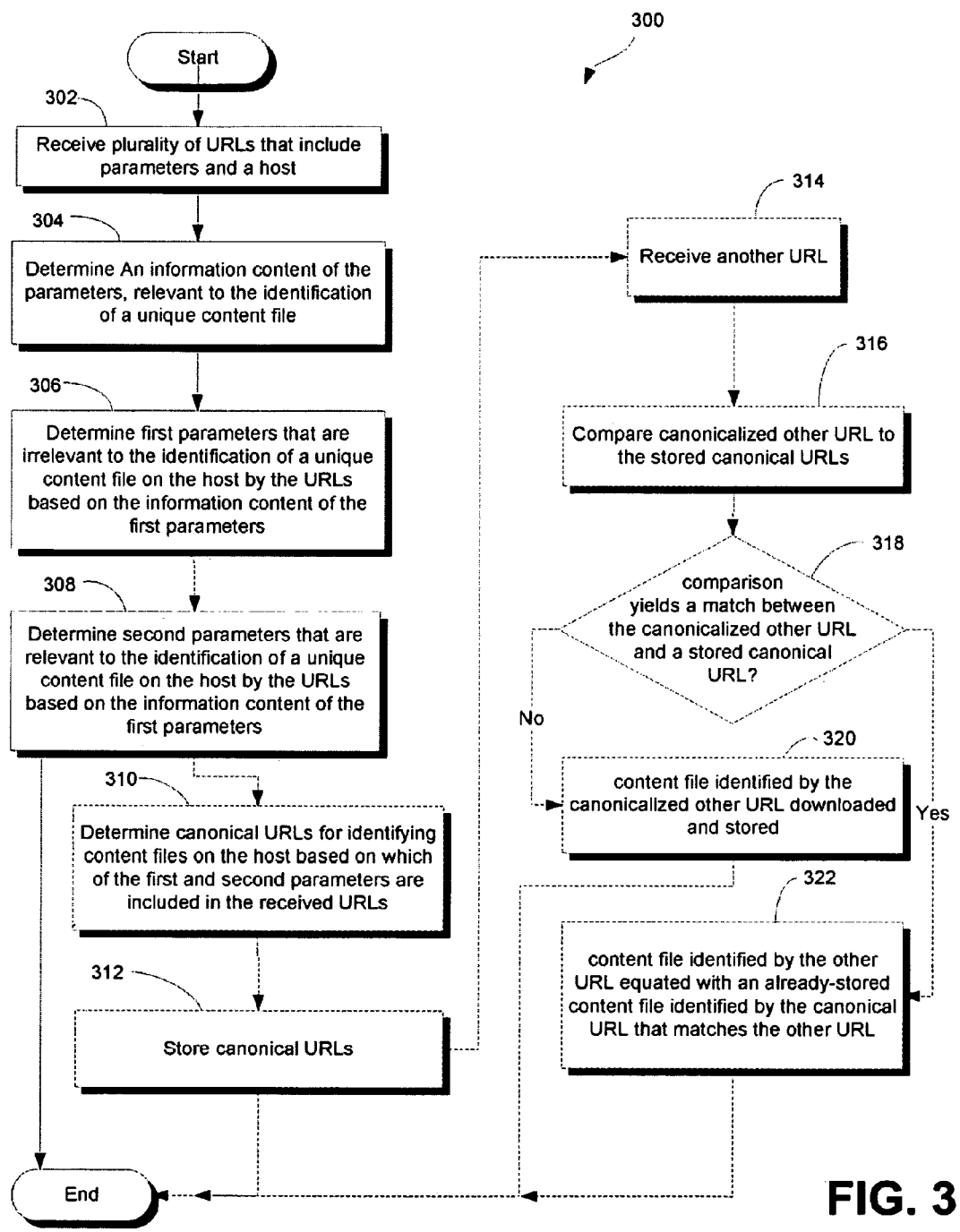
FIG. 3 is a flowchart illustrating other example operations of the system of FIG. 1.

FIG. 3 is a flowchart 300 illustrating other example operations of the system of FIG. 1. After a start operation, a plurality of URLs are received (302), where the URLs identify a host and content files and include at least one parameter. An information content of the parameters, relevant to the identification of a unique content file, is determined (304), and the determination is based, at least in part, on an entropy of values of fingerprints of the content files conditional on values of the parameters and based, at least in part, on an entropy of values of the parameters conditional on values of the fingerprints. First parameters that are irrelevant to the identification of a unique content file on the host by the URLs are determined (306) based, at least in part, on the information content of the first parameters. In addition, second parameters that are relevant to the identification of a unique content file on the host by the URLs are determined (308) based, at least in part, on the information content of the second parameters.

In one implementation, canonical URLs for identifying content files on the host can be determined based on which of the first and second parameters are included in the received URLs (310) and these canonical URLs can be stored (312) (e.g., in the database 128). For example, the CUG 127 can canonicalize one of the received URLs by applying a canonicalization function to the URL. The canonicalization function can act to retain relevant parameters and discard irrelevant parameters in the received URL. Another URL in addition to the plurality of URLs can be received (314). The other URL can be canonicalized and compared to the stored canonical URLs (316), and, if the comparison yields a match between the other URL and a stored canonical URL (318), then a content file identified by the other URL can be downloaded and stored (320). Otherwise, a content file identified by the other URL can be equated with an already-stored content file identified by the canonical URL that matches the other URL (322).

Figure 4:
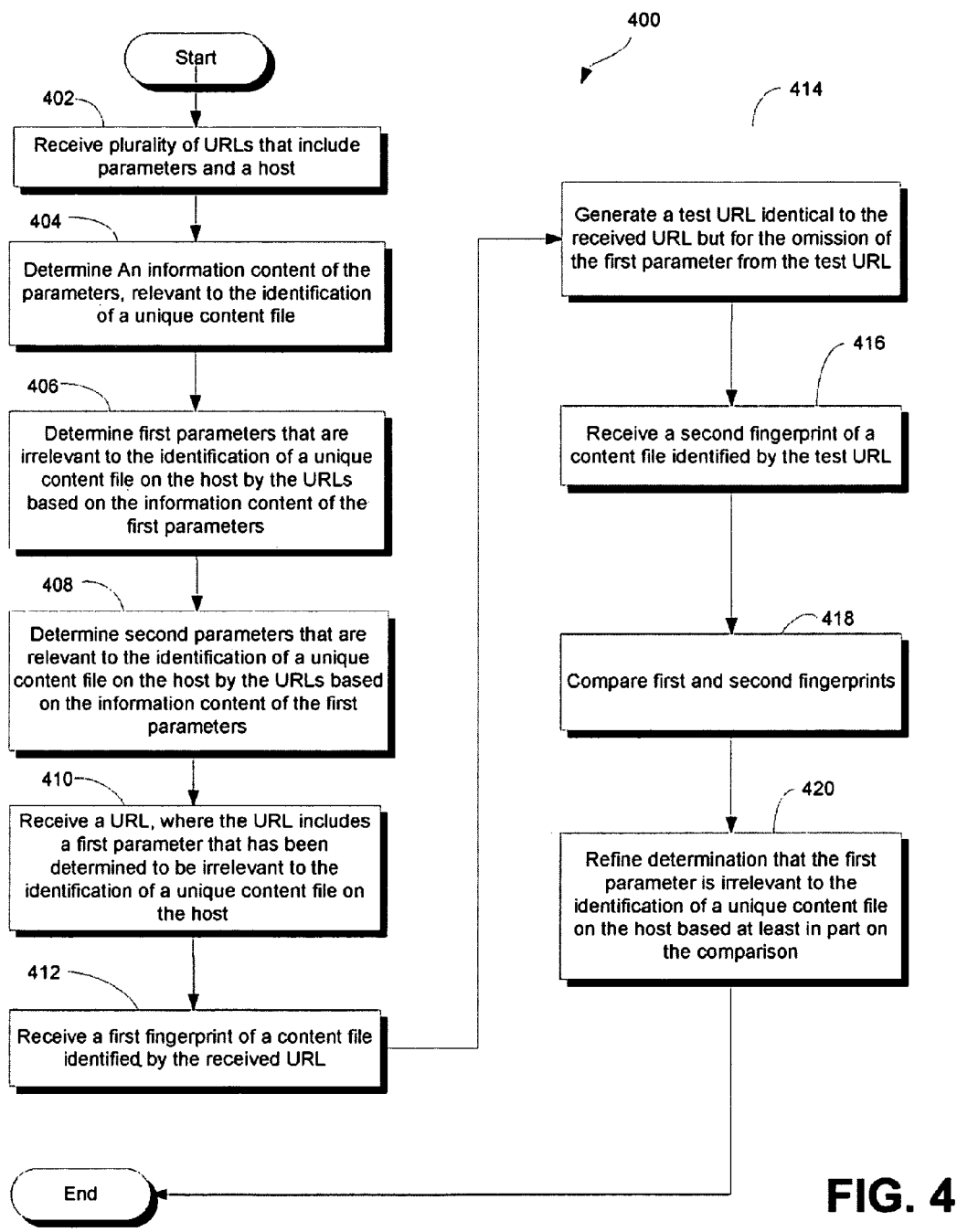
FIG. 4 is a flowchart illustrating more example operations of the system of FIG. 1.

FIG. 4 is a flowchart 400 illustrating other example operations of the system of FIG. 1. As in the flowchart shown in FIG. 3, after a start operation, a plurality of URLs are received (402), where the URLs identify a host and content files and include at least one parameter. An information content of the parameters, relevant to the identification of a unique content file, is determined (404), and the determination is based, at least in part, on an entropy of values of fingerprints of the content files conditional on values of the parameters and based, at least in part, on an entropy of values of the parameters conditional on values of the fingerprints. First parameters that are irrelevant to the identification of a unique content file on the host by the URLs are determined (406) based, at least in part, on the information content of the first parameters. In addition, second parameters that are relevant to the identification of a unique content file on the host by the URLs are determined (408) based, at least in part, on the information content of the second parameters.

Then, a URL is received, where the URL includes a first parameter that has been determined to be irrelevant to the identification of a unique content file on the host (410). A first fingerprint of a content file identified by the received URL is received (412). A test URL identical to the received URL but for the omission of the first parameter from the test URL is generated (414). A second fingerprint of a content file identified by the test URL is received (416), and the first and second fingerprints are compared (418). The determination that the first parameter is irrelevant to the identification of a unique content file on the host can be refined based at least in part on the comparison (420).

Implementations of the various techniques described herein may be implemented in digital electronic circuitry, or in computer hardware, firmware, software, or in combinations of them. Implementations may implemented as a computer program product, i.e., a computer program tangibly-embodied in a machine-readable storage device (e.g., a random access memory, a read only memory, a hard disk, an optical disk, or combinations thereof), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method comprising:
receiving a plurality of uniform resource locators (URLs), wherein the URLs identify content files, and wherein the URLs include at least one parameter, wherein a parameter consists of a subportion of the entire received URL;
identifying fingerprints of the content files;
determining a first entropy of values of the fingerprints conditional on values of a first parameter of the at least one parameter included by the received URLs, wherein the first entropy represents an uncertainty that remains about the values of the parameter, given that the fingerprints are known; and
determining a second entropy of values of the first parameter conditional on values of the fingerprints, wherein the second entropy represents an uncertainty that remains about which fingerprint is pointed to by a URL that includes the first parameter, given that a value of the first parameter is known;
determining that the first parameter is irrelevant to the identification of a unique content file by the URLs based, at least in part, on the first and second entropy values; and based on the determination that the first parameter is irrelevant to the identification of unique content file by the URLs, determining one or more canonical URLs for identifying one or more respective content files, wherein a canonical URL is equivalent, for purposes of identifying content, to different received URLs that reference the same content; and storing the one or more canonical URLs.

2. The method of claim 1, wherein determining that the first parameter is irrelevant to the identification of a unique content file by the URLs comprises:

determining that the first entropy is greater than a first threshold value and determining that the second entropy is greater than a second threshold value.

3. The method of claim 1, further comprising:

determining a third entropy of values of the fingerprints conditional on values of a second parameter, wherein the second parameter is different from the first parameter;

determining a fourth entropy of values of the second parameter conditional on values of the fingerprints; and determining that the second parameter is relevant to the identification of a unique content file by the URLs based, at least in part, on the third and fourth entropy values.

4. The method of claim 3, wherein determining that the second parameter is relevant to the identification of a unique content file by the URLs comprises:

determining that the third entropy is less than a third threshold value and determining that the fourth entropy is less than a fourth threshold value.

5. The method of claim 4, further comprising:

receiving another URL in addition to the plurality of URLs; and identifying the other URL as equivalent to one of the plurality of URLs for purposes of identifying a particular content file based at least on the other URL and the equivalent URL having an identical value for the second parameter, wherein the other URL and the equivalent URL having different values for the first parameter.

6. The method of claim 5, further comprising:

caching a copy of the particular content file; and serving a copy of the cached particular content file in response to a request for a content file identified by the other URL; and serving a copy of the cached particular content file in response to a request for a content file identified by the equivalent URL.

7. The method of claim 1, wherein a parameter includes a non-domain prefix part of the host portion of the URL, a path of the URL or a portion of the path of the URL, or a query parameter of a query portion of the URL.

8. A computer-implemented method comprising:

receiving a plurality of uniform resource locators (URL), the URLs identifying a host and content files, and wherein the URLs include a plurality of parameters, wherein a parameter consists of a subportion of an entire received URL;

determining an information content, relevant to the identification of a unique content file, of the parameters, wherein the determination of the information content is based, at least in part, on first entropy of values of fingerprints of the content files conditional on values of the parameters included by the received URLs, wherein the first entropy represents an uncertainty that remains about the values of the parameter given that the fingerprints are known and based, at least in part, on second entropy of values of the parameters conditional on values of the fingerprints, wherein the second entropy represents an uncertainty that remains about which fingerprint is pointed to by a URL that includes the first parameter, given that a value of the first parameter is known;

determining first parameters that are irrelevant to the identification of a unique content file on the host by the URLs based, at least in part, on the information content of the first parameters;

determining second parameters that are relevant to the identification of a unique content file on the host by the URLs based, at least in part, on the information content of the second parameters; and determining one or more canonical URLs for identifying one or more respective content files on the host based on which of the first and second parameters are included in the received URLs, wherein a canonical URL is equivalent, for purposes of identifying content, to different received URLs that reference the same content; and storing the one or more canonical URLs.

9. The method of claim 8, further comprising:

storing content files identified by the canonical URLs;

receiving another URL in addition to the plurality of URLs;

canonicalizing the other URL;

comparing the canonicalized other URL to the stored canonical URLs;

if the comparison does not yield a match between the canonicalized other URL and a stored canonical URL, then downloading a content file identified by the other URL and storing the downloaded content file; and if the comparison yields a match between the canonicalized other URL and a stored canonical URL, then equating a content file identified by the other URL with an already-stored content file identified by the canonical URL that matches the other URL.

10. The method of claim 8, wherein determining the first and second parameters comprises:

for a plurality of paths on the host, determining an information content, relevant to the identification of a unique content file stored on the host, of parameters associated with the plurality of URLs, wherein the determination of the information content is based, at least in part, on an entropy of values of fingerprints of the content files conditional on values of the parameters and based, at least in part, on an entropy of values of the parameters conditional on values of the fingerprints; and for the plurality of paths on the host, determining parameters that are irrelevant to the identification, by the URLs, of a unique content file on the host and a path based, at least in part, on the information content of the parameters; for the plurality of paths on the host, determining parameters that are relevant to the identification, by the URLs, of a unique content file on the host and a path based, at least in part, on the information content of the parameters; and for a parameter that is determined to be irrelevant to the identification of a unique content file on the host and on at least one path but is determined to be relevant to the identification of a unique content file on the host and on at least one other path, determining that the parameter is irrelevant to the identification of a unique content file on the host when a ratio between a number of paths for which the path is irrelevant and a number of paths is relevant is greater than a threshold value, and otherwise determining that the parameter is relevant.

11. The method of claim 8, furthering comprising:
storing a first list of parameters that are predetermined to be universally irrelevant across a plurality of hosts to the identification of a unique content file on the host by the URLs;
storing a second list of parameters that are predetermined to be universally relevant across a plurality of hosts to the identification of a unique content file on the host by the URLs;
determining first parameters that are irrelevant to the identification of a unique content file on the host by the URLs based, at least in part, on the information content of the first parameters and on a comparison with parameters of the second list; and
determining second parameters that are relevant to the identification of a unique content file on the host by the URLs based, at least in part, on the information content of the second parameters and on a comparison with parameters of the first list.

12. The method of claim 8, wherein a parameter of the plurality of parameters includes a sub-URL.

13. The method of claim 8, wherein a parameter of the plurality of parameters includes case-sensitivity of a parameter name.

14. The method of claim 8, wherein a parameter of the plurality of parameters includes a path name in the URLs.

15. The method of claim 8, wherein a parameter of the plurality of parameters includes a prefix of a domain name in the URLs.

16. The method of claim 8, further comprising:
receiving a URL including a first parameter that has been determined to be irrelevant to the identification of a unique content file on the host;
receiving a first fingerprint of a content file identified by the received URL;
generating a test URL identical to the received URL but for the omission of the
first parameter from the test URL;
receiving a second fingerprint of a content file identified by the test URL;
comparing the first and second fingerprints; and
refining the determination the first parameter is irrelevant to the identification of a unique content file on the host based at least in part on the comparison.

17. The method of claim 8, wherein a parameter includes a non-domain prefix part of the host portion of the URL, a path of the URL or a portion of the path of the URL, or a query parameter of a query portion of the URL.

18. A non-transitory computer-readable storage medium comprising executable instructions that, when executed, are configured to cause a data processing apparatus to:
receive a plurality of uniform resource locators (URL), the URLs identifying a host and content files stored on the host, and wherein the URLs include a plurality of parameters, wherein a parameter consists of a subportion of an entire received URL;
determine an information content, relevant to the identification of a unique content file stored on the host, of the parameters, wherein the determination of the information content is based, at least in part, on first entropy of values of fingerprints of the content files conditional on values of the parameters included by the received URLs, wherein the first entropy represents an uncertainty that remains about the values of the parameter given that the fingerprints are known and based, at least in part, on second entropy of values of the parameters conditional on values of the fingerprints, wherein the second entropy represents an uncertainty that remains about which fingerprint is pointed to by a URL that includes the first parameter, given that a value of the first parameter is known;
determine first parameters that are irrelevant to the identification of a unique content file on the host by the URLs based, at least in part, on the information content of the first parameters; and
determine second parameters that are relevant to the identification of a unique content file on the host by the URLs based, at least in part, on the information content of the second parameters; and
determine one or more canonical URLs for identifying one or more respective content files on the host based on the first and second parameters and based on the received URLs, wherein a canonical URL is equivalent, for purposes of identifying content, to different received URLs that reference the same content; and
store the one or more canonical URLs.

19. The non-transitory computer-readable storage medium of claim 18, further comprising executable instructions that, when executed, are configured to cause the data processing apparatus to:
store content files identified by the canonical URLs;
receive another URL in addition to the plurality of URLs;
canonicalize the other URL;
compare the canonicalized other URL to the stored canonical URLs;
if the comparison does not yield a match between the other URL and a stored canonical URL, then cause a content file identified by the other URL to be downloaded and stored; and
if the comparison yields a match between the canonicalized other URL and a stored canonical URL, then equate a content file identified by the other URL with an already-stored content file identified by the canonical URL that matches the other URL.

20. The non-transitory computer-readable storage medium of claim 18, wherein a parameter includes a non-domain prefix part of the host portion of the URL, a path of the URL or a portion of the path of the URL, or a query parameter of a query portion of the URL.

21. A system for crawling and indexing online content, the system comprising:
a parser configured to parse a plurality of URLs to identify parameters in the URLs, wherein the URLs identify a host and content files stored on the host, wherein a parameter consists of a subportion of an entire parsed URL;
an information content calculation module configured to determine an information content, relevant to the identification of a unique content file, of the parameters, wherein the determination of the information content is based, at least in part, on first entropy of values of fingerprints of the content files conditional on values of the parameters included by the received URLs, wherein the first entropy represents an uncertainty that remains about the values of the parameter given that the fingerprints are known and based, at least in part, on second entropy of values of the parameters conditional on values of the fingerprints, wherein the second entropy represents an uncertainty that remains about which fingerprint is pointed to by a URL that includes the first parameter, given that a value of the first parameter is known;
a relevancy calculation module configured to determine first parameters that are irrelevant to the identification of a unique content file on the host by the URLs based, at least in part, on the information content of the first parameters and configured to determine second parameters that are relevant to the identification of a unique content file on the host by the URLs based, at least in part, on the information content of the second parameters, wherein the relevancy calculation module is further configured to determine one or more canonical URLs for identifying one or more respective content files on the host based on the first and second parameters and based on the received URLs; and a first storage device configured to store the one or more canonical URLs, wherein a canonical URL is equivalent, for purposes of identifying content, to different parsed URLs that reference the same content.

22. The system of claim 21, further comprising:
a second storage device configured to store content files identified by the canonical URLs; and
an indexer configured to associate the stored content files with the canonical URLs.

23. The system of claim 22, further comprising:
a comparison module configured to compare a URL to the stored canonical URLs;
a download module configured to download a content file identified by the URL for storage in the second storage medium in response to an output from the comparison module indicating a match between the URL and a stored canonical URL does not exist; and
wherein the indexer is further configured to, in response to an output from the comparison module indicating a match between the URL and a stored canonical URL, associate the URL with the stored content file associated with the matching stored canonical URL.

24. The system of claim 21, wherein a parameter includes a non-domain prefix part of the host portion of the URL, a path of the URL or a portion of the path of the URL, or a query parameter of a query portion of the URL.

* * * * *